United States Patent [19]

Vilms

[11] 4,134,219

[45] Jan. 16, 1979

[54] SPEECH REFLECTOR

[76] Inventor: Juri Vilms, 1330 Harker Ave., Palo Alto, Calif. 94301

[21] Appl. No.: 908,938

[22] Filed: May 24, 1978

Related U.S. Application Data

[63] Continuation of Ser. No. 737,839, Nov. 1, 1976, abandoned.

[51] Int. Cl.² .............................................. G09B 19/04
[52] U.S. Cl. .................................................. 35/35 C
[58] Field of Search ............... 35/35 R, 35 C; 181/18, 181/20, 21; 132/79 G, 80 A, 83 E

[56] References Cited

U.S. PATENT DOCUMENTS

| 894,685 | 7/1908 | McIsaac | 132/80 A |
|---|---|---|---|
| 1,494,019 | 5/1924 | Rasmussen | 181/20 |
| 3,148,461 | 9/1964 | Johnson | 35/35 R X |
| 3,167,871 | 2/1965 | Brooks | 35/35 C |
| 3,244,816 | 4/1966 | Karns | 35/35 C X |
| 3,259,204 | 7/1966 | Gerwick | 181/20 |
| 3,271,883 | 9/1966 | Freeman | 35/35 C |

*Primary Examiner*—William H. Grieb

[57] ABSTRACT

A speech reflector adapted to be placed adjacent the mouth of the user and reflecting sound from the user's mouth to his ear to provide enhanced hearing of his own speech, is described.

1 Claim, 2 Drawing Figures

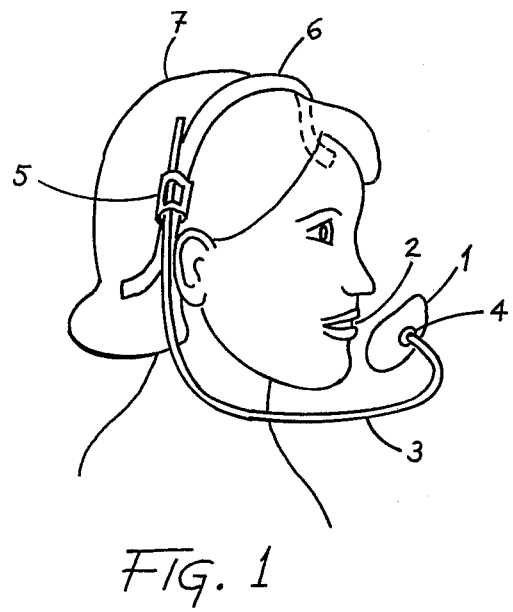
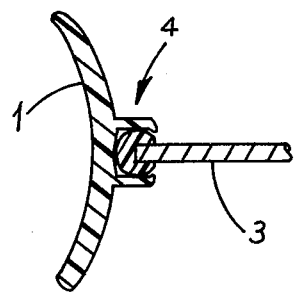
FIG. 1
FIG. 2

SPEECH REFLECTOR

BACKGROUND OF THE INVENTION

This is a continuation of application Ser. No. 737,839, filed Nov. 1, 1976, now abandoned.

This invention relates generally to devices for helping a person to hear himself better and to educational aids for learning pronunciation and enunciation.

When a person is speaking, the high frequency portion of the sound vibrations produced by his vocal apparatus is projected most strongly directly forward, in the direction of a listener, and less strongly to the sides and backwards, toward his own ears. The lower frequencies are also additionally transmitted internally through his own head to his middle and inner ear structures. Consequently, a speaker tends to hear the high frequencies of his own speech relatively less loudly than does a listener, and in particular, tends not to hear his own consonants, unvoiced sounds, and other details of pronunciation and enunciation characterized by high frequencies, as well as a listener.

In prior art, various mechanical sound guides and electrical devices have been used to allow a speaker to hear himself as he sounds to others, but these have been relatively complicated or confining to the user.

SUMMARY OF THE INVENTION

In general, the present invention provides a simple mechanical speech reflector which comprises a supporting means adapted to engage the head of the user, and a sound reflecting plate, tiltably secured to the supporting means and thereby held adjacent the mouth of the user, whereby sound is directed by a single reflection from the user's mouth to one of his ears. The size of the sound reflecting plate and its position and orientation are appropriate to reflect especially the high frequency portion to speech. The supporting means are adapted to engage the head of the user.

Accordingly, it is an object of this invention to provide a new improved speech reflector by which sound is directed by a single reflection from the user's mouth to his ear in order to enhance his hearing of his own speech.

Another object of the present invention is to provide a simple and inexpensive speech reflector for enabling a user to hear himself better and more as he sounds to others.

A further object of this invention is to provide a speech reflector that is not confining to the user and allows freedom of movement and expression.

BRIEF DESCRIPTION OF THE DRAWINGS

FIG. 1 shows the preferred embodiment of the speech reflector in position on a user; and FIG. 2 is an enlarged cross-sectional view of the preferred embodiment of the sound reflecting plate and the distal part of the boom, showing their ball and socket connection.

DESCRIPTION OF THE PREFERRED EMBODIMENT

Referring now to FIG. 1 there is shown the sound reflecting plate 1 positioned adjacent the mouth 2 of the user and secured to the distal end of the boom 3 by a ball and socket joint 4, the boom 3 being secured by spring clip 5 to headband 6, which is adapted to engage the head 7 of the user. Spring clip 5 is shaped to receive and hold the headband and the boom securely together by friction while permitting the boom to be rotated and slid up and down relatively to the headband upon application of sufficient force, for positioning of the sound reflecting plate. The boom 3 is made of yieldable material which is formed into perdetermined shape but may also be further bent by the user as an additional means of positioning. In FIG. 2 there is shown in greater detail the sound reflecting plate 1 and its ball and socket joint 4, which provides a secure connection but allows universal tilting of the sound reflecting plate about the end of the boom upon application of sufficient force. The sound reflecting plate 1 is shown to be an oval-shaped, slightly curved, solid plate measuring several inches across its largest dimension, but it is understood that any sound reflecting plate of similar size and rectangular, oval, or circular shape and having a flat or curved surface may equally be employed, according to the teaching of this invention. Suitable materials of construction include plastic, metal, and plastic coated metal.

Considering now the functional operation of the means which have been particularly described, the sound reflecting plate is positioned adjacent the mouth of the user and tilted appropriately to best reflect sound from her mouth to her ear. It is a general phenomenon of wave reflection that an object of a fixed size will reflect specularly and with maximum intensity those waves having a wavelength much smaller than the object, and that it will scatter, rather diffusely and with lessening intensity with increasing wavelength, those waves having a wavelength larger than the object. The exact shape of the object and its material of construction are of secondary importance in this regard. The sound reflecting plate being larger in size than a wavelength of sound at frequencies of three or four thousand Herz and higher, it reflects these high frequencies of sound especially effectively but the lower frequencies not as well. Now while the user is speaking, a part of the sound projecting forward from her mouth is intercepted by the sound reflecting plate and directed by a single reflection back toward her ear, with the high frequencies being enhanced in the reflected sound. Consequently the user is enabled to hear herself better in general, more as she sounds to others, and especially to hear better her own consonants, unvoiced sounds, and other details of pronunciation and enunciation characterized by high frequencies.

It is understood that modifications and variations may be made, as deemed necessary, in the construction and arrangement of parts of the invention as shown and described, without departing from the scope of the appended claim.

I claim:

1. A speech reflector comprising a supporting means adapted to engage the head of the user, and a small sound reflecting plate having its largest dimension in the range of one to five inches, the said plate being tiltably secured to the said supporting means and therefrom positioned adjacent the mouth of the user at an angle at which sound is thereby best directed by a single reflection from the user's mouth to her ear.

* * * * *